Figure 4:
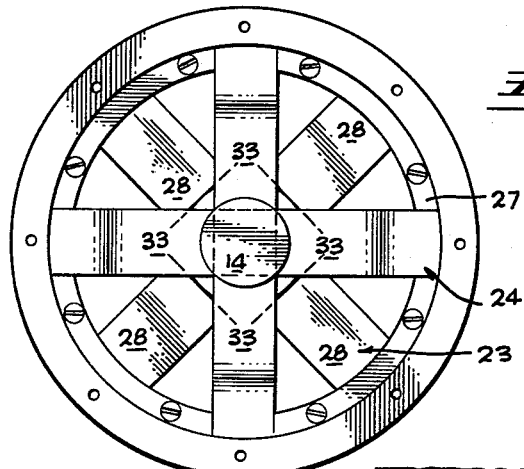

April 13, 1965
JAMES E. WEBB
ADMINISTRATOR OF THE NATIONAL AERONAUTICS
AND SPACE ADMINISTRATION
THERMAL SWITCH
Filed Feb. 15, 1963
3,177,933
2 Sheets-Sheet 1
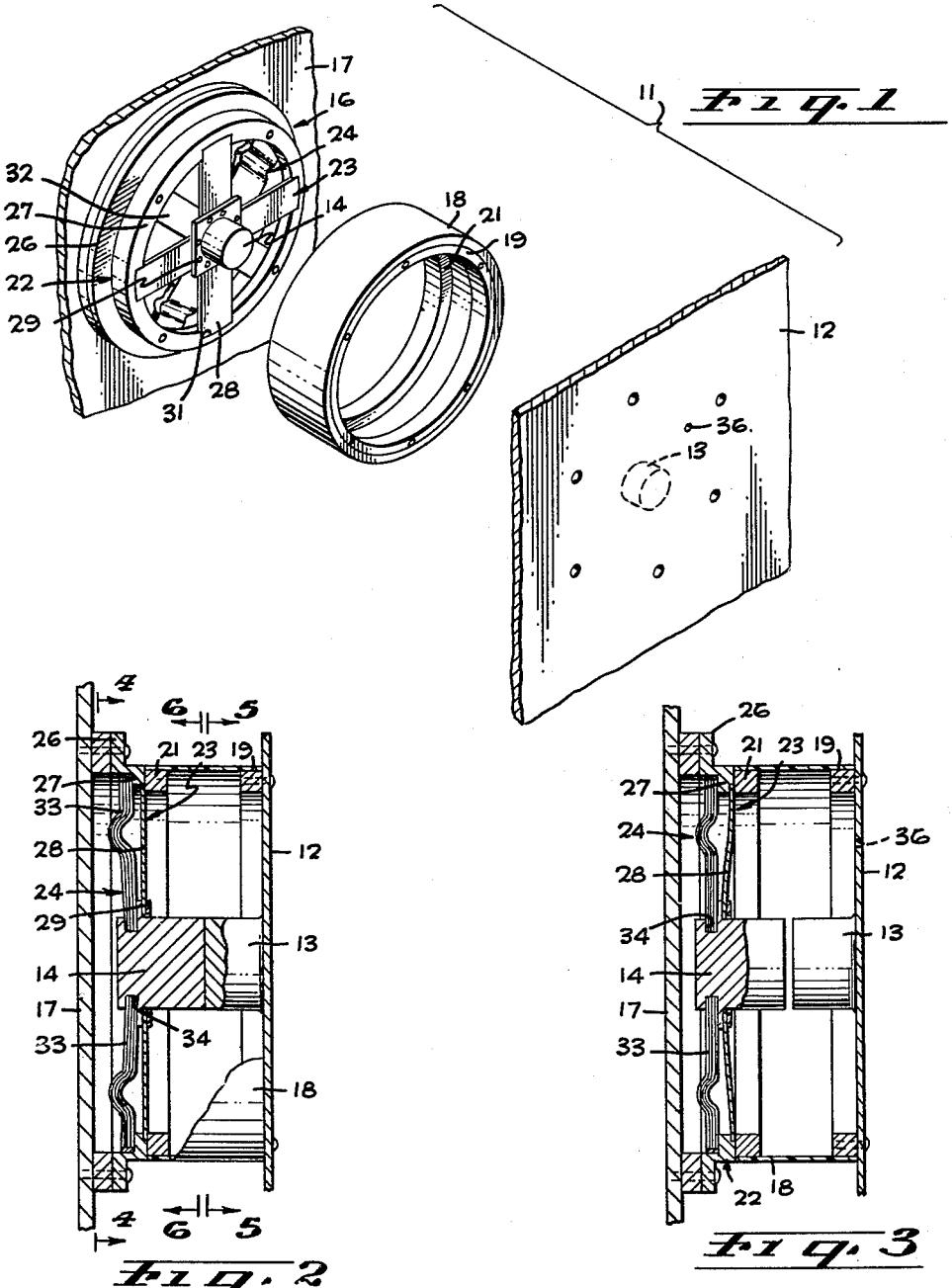
INVENTOR.
JOHN M. BOZAJIAN
BY
Howard B. Scheckman
ATTORNEYS

INVENTOR.
JOHN M. BOZAJIAN

3,177,933
THERMAL SWITCH
James E. Webb, Administrator of the National Aeronautics and Space Administration, with respect to an invention of John M. Bozajian, Inglewood, Calif.
Filed Feb. 15, 1963, Ser. No. 259,487
11 Claims. (Cl. 165—96)

This invention relates generally to devices for selectively transferring heat from one region to another in accordance with cyclic variation in temperature of the first region so as to maintain same at a constant temperature. The invention is more particularly directed to a thermal switch for the foregoing purpose, which is operable to establish a heat transfer path between a first region and a second heat dissipating region in response to temperatures equal to or greater than a predetermined temperature while preventing or minimizing heat transfer at temperatures below the predetermined temperature to thereby maintain the first region at substantially the predetermined temperature.

In various applications it is desirable that a surface, region, or the like, subjected to cyclic variation in temperature be maintained at a substantially constant predetermined temperature. To this end, it is desirable that heat be conserved when the temperature is below the desired constant temperature and that heat be efficiently dissipated when the temperature exceeds the desired constant temperature. For example, in connection with various space craft, such as satellites orbiting the earth, or interplanetary probes, it is necessary that a constant temperature on certain component parts within the craft be maintained under varying external and/or internal heat loads. Many spacecraft missions impose such varying heat loads due to the cyclic solar radiation environment and variable electronic component dissipations within instrument compartments. It is desirable that the regions of the instrument packages be controlled in order to maintain a substantially constant temperature therein despite the cyclic temperature variation of the environment. By conserving internal heat energy within the compartment, when it is subjected to a cold or shaded environment, and dissipating heat from the compartment when internal temperatures become excessive, a relatively constant tolerable compartment temperature may be maintained which is compatible with reliable operation of the instrument packages enclosed therein. It will be thus appreciated that in the foregoing specific application, as well as under other equivalent conditions of variable heat load, it is desirable that means be provided to automatically and unattendedly provide for the selective dissipation and conservation of heat in response to cyclic variations in temperature above and below a predetermined temperature. In this manner it is possible to continuously regulate temperatures to the desired predetermined value.

Accordingly, it is an object of the present invention to provide a thermal switch which is capable of establishing a high conductivity heat transfer path from a first region to a second heat dissipating region when temperatures in the first region are equal to or greater than a predetermined temperature, and substantially insulating the first and second regions from each other when the temperature of the first region is below the predetermined temperature.

Another and more specific object of the invention is the provision of a thermal switch in which a pair of thermal contacts are provided in heat exchange relation with a pair of high conductivity surfaces thermally insulated from each other, temperature responsive means being also provided to mount one of the contacts for movement into and out of engagement with the other contact in response to temperature variation of the first surface above and below a predetermined temperature. As a result, when the first surface exceeds the predetermined temperature, the contacts establish a high conductivity heat transfer path between the first and second surfaces and excess heat is transferred therebetween. When the first surface is below the predetermined temperature, the contacts are responsively opened to disrupt the conduction path whereby negligible heat transfer occurs between the two surfaces and heat is conserved at the first surface. Consequently, the temperature at the first surface is continuously regulated to the predetermined temperature.

It is yet another object of the invention to provide a thermal switch of the class described which is capable of completely automatic and unattended temperature regulation.

It is still another object of the invention to provide a thermal switch of the class described wherein means are provided to prevent seizure or cold welding of the thermal contacts under conditions of high temperature and low pressure to thereby insure reliable switch operation over a wide range of environmental conditions, such as are encountered in outer space.

One other object of the invention is the provision of a thermal switch having a relatively simple, yet rugged construction.

It is a further object of the invention to provide a thermal switch which is ideally suited to the thermal control of spacecraft components to maintain substantially constant temperature conditions thereat, irrespective of cyclic solar radiation environments and the like to which they may be subjected during spacecraft missions.

Figure 5:
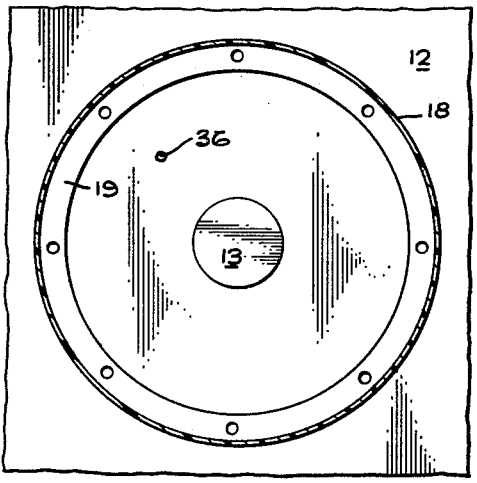
Figure 6:
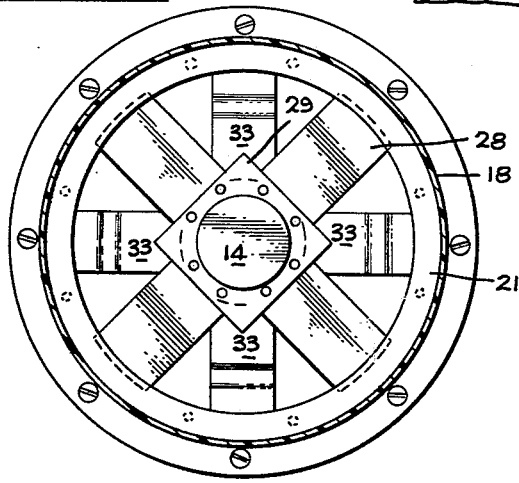

Further objects and advantages of the invention will become apparent upon consideration of the following description taken in conjunction with the accompanying drawings pertaining to a single preferred embodiment of the present invention, wherein:

FIGURE 1 is an exploded perspective view of the thermal switch of the present invention, FIGURE 2 is a side elevational view of the switch with portions broken away to illustrate the internal construction, the switch being depicted in closed thermal conducting condition, FIGURE 3 is a view similar to FIGURE 2, but depicting the switch in open thermal insulating condition, FIGURE 4 is a sectional view taken at line 4—4 of FIGURE 2, FIGURE 5 is a sectional view taken at line 5—5 of FIGURE 2, and FIGURE 6 is a sectional view taken at line 6—6 of FIGURE 2.

Considering now the invention in somewhat greater detail, and referring to the illustrated form thereof in the drawing, a thermal switch 11 in accordance with the present invention is seen to include in basic respects a thermally conductive plate 12, or the like, arranged to dissipate heat by radiation and/or conduction, and having a fixed thermal contact 13 projecting therefrom. The contact is in thermally conducting relation with the plate and preferably is integral therewith. The switch further includes a movable thermal contact 14 in association with temperature responsive mounting means 16, adapted for thermally conducting securance to a surface of a member to be temperature controlled, such as a second plate 17. The plate 12 and mounting means 16 are secured to opposite ends of a thermally insulating housing, or case 18 with the thermal contacts 13, 14 being disposed therein in alignment. It will be thus appreciated that the case 18 thermally isolates the plate 12 from the mounting means 16, and therefore from any surface, such as plate 17, to which the mounting means may be attached. The mounting means 16 is arranged, in a manner subsequently described in detail, to translate the contact 14 into and out of thermal conducting engagement with contact 13 in response to the plate 17, or other surface to which the mounting means 16 is secured, varying in temperature above and below a predetermined temperature. The mounting means 16 is further arranged to establish a high conductivity heat transfer path between contact 14 and the plate 17, or other surface. Hence, when the temperature of plate 17, or other surface, equals or exceeds the predetermined temperature, and the contacts 13, 14 are responsively engaged, as depicted in FIGURE 2, a high conductivity heat transfer path is established from the plate 17, through the mounting means 16 and contacts 13, 14 to the plate 12. The excess heat is readily dissipated from plate 12, to in turn decrease the temperature at plate 17. When plate 17 is at a temperature below the predetermined temperature and the contacts are disengaged, as depicted in FIGURE 3, the high conductivity heat transfer path through the contacts is broken, and inasmuch as the plate 12 and mounting means 16 are insulated from each other by the case 18, transfer of heat between the plate 12 and plate 17 can occur only by radiation and gaseous conduction at a relatively low rate. Heat is now consequently conserved at plate 17 until such time as the temperature thereof becomes excessive and the switch is again actuated to effect heat transfer to plate 12 for dissipation.

Although the thermal switch outlined hereinbefore may take a variety of specific structural forms, in the preferred embodiment depicted in the drawings the contacts 13, 14 are preferably provided as cylindrical plugs of high conductivity material, such as copper or aluminum. In addition, the opposed faces of the contacts are preferably of low waviness, and selected to have a negligible root mean square roughness less than, for example, 50 microinches, to facilitate minimization of contact thermal resistance. The case 18 is preferably of cylindrical tubular configuration and fabricated from a low conductivity plastic or equivalent material. Rings 19 and 21, or the like, are advantageously provided within the opposite ends of the case to define flange structure for facilitating attachment of plate 12 and mounting means 16 to the opposite ends thereof.

Considering now the temperature responsive mounting means 16 in greater detail as to preferred structure, such means advantageously includes a ring 22 of copper, or equivalent high conductivity material. The ring is attached at one end to the flange ring 21 of the case 18, and is adapted for attachment at the other end to a surface, such as plate 17, which it is desired be controlled as to temperature. The ring 22 also serves to mount a temperature responsive translating element 23 in association with the contact 14, and a high conductivity thermal conductance member 24 extending between such contact and the ring to define a high conductivity heat transfer path. To the foregoing ends, the ring 22 is preferably formed with an outwardly flared flange 26 at one end and an inwardly flared flange 27 at its opposite end to respectively facilitate bolted attachment to a surface, such as plate 17, and bolted coaxial attachment to the ring 21 of case 18. The temperature responsive translating member 23 is then advantageously provided as a bi-metallic disc, or, more preferably, a plurality of bi-metallic strips in radial disposition extending transversely between the flange 27 and the contact plug 14, the latter being coaxially disposed relative to the ring 22. More explicitly, in the preferred strip construction of the element 23, four bi-metallic strips 28 are preferably arrayed in a cruciform, with the inner ends of the strips being secured to the plug 14 at, for example, the four sides of a square collar 29 carried by the plug. Securance of the outer ends of the strips is facilitated as by means of grooves 31 provided in the exterior face of flange 27 at 90° intervals and extending radially outward from its inner periphery. The grooves 31 receive the outer ends of the strips 28 and accordingly, the flange 27 is secured to the ring 21 of case 18, the outer ends of the strips are clamped therebetween. Thus, the bi-metallic strips 28 support the contact plug 14 centrally of the ring 22 and casing 18, and in response to temperature changes serve to translate the plug coaxially of the case. The strips are appropriately designed relative to their positions of attachment to the plug 14, and to the position of such plug relative to the plug 13, such that for strip temperatures below a predetermined temperature, the plug 14 is held out of engagement with plug 13 and a gap exists therebetween as depicted in FIGURE 3. At the predetermined temperature, however, the strips position the plug 14 in engagement with plug 13, as depicted in FIGURE 2, and for temperatures in excess of the predetermined temperature, the strips urge the plug 14 against the plug 13 with increased pressure. The bi-metallic strips are both conduction and radiation coupled to a surface, such as plate 17, to which the mounting ring 22 may be attached and accordingly the predetermined contact temperature of the strips is substantially equal to that at the surface. Maximized radiation coupling between the strips and surface, of course, contributes to the equality of the temperatures thereat, and to this end the exteriorly facing strip surfaces are preferably of a high emittance.

It will be appreciated that slight deviations between the thermal responses of the respective bi-metallic strips 28 may exist which tend to effect a slight misalignment between the contacts 13, 14 which would detract from a flat uniform contact therebetween. This difficulty may be greatly minimized by providing a slight amount of free play between the outer ends of the strips and the support grooves 31. A two-to-three mil circumferential gap, for example, between the strips and grooves allows sufficient rotation of the plug 14 to substantially counteract any slight misalignment effects. The elastic compliance of the cruciform bi-metal assembly also contributes to the misalignment compensation and as an overall result a substantially flat uniform contact is provided between the plugs 13, 14.

As regards the thermal conduction member 24 of the temperature responsive mounting means 16, this member may be advantageously provided as a plurality of flexible strips possessing high thermal conductivity, radially secured between the plug 14 and the mounting ring 22. More particularly, four groups 32 of superposed thin foil strips 33, of copper, or similar material possessing a high thermal conductance, are preferably provided in the form of a cruciform. The foil strip groups are secured between the plug 14 and ring 22 at positions circumferentially intermediate the bi-metallic strips 28 so as to not interfere with the line-of-sight radiation coupling between the latter and the surface to be temperature controlled. In other words, the groups 32 of foil strips are displaced 45° from the bi-metallic strips 28. To facilitate securance of the groups of foil strips, they are preferably secured at their inner ends within a circumferential groove 34 formed in the plug 14 at a position longitudinally outwardly displaced from the collar 29 of the bi-metallic strip assembly. The outer ends of the groups of foil strips are secured, as by brazing or equivalent mechanical fastening means, to the interior surface of the inwardly flared flange 27 of the ring 22. The flexibility of the groups of foil strips is, of course, selected so as to contribute minimum restraint to the motion of the bi-metal strips 28. In this regard the stiffness of the foil strip assembly is preferably made less than 5% of that of the bi-metal. Thus, the groups of foil strips have negligible effect on the temperature responsive translating action of the bi-metallic strips 28 imparted to the plug 14, and yet the groups of foil strips define a high conductivity heat transfer path between the ring 22 and the plug 14 to facilitate the ready flow of heat between a surface to which the ring may be attached, and the plug 14.

With the switch thus constructed and the ring 22 secured to plate 17 or other surface to be controlled to a predetermined temperature, the switch functions in the manner previously outlined to channel excess heat from the plate 17 to the plate 12 for dissipation, and to conserve heat at the plate 17, in response to temperature fluctuations at plate 12 about the predetermined temperature. More particularly, for temperatures of plate 17 below the predetermined temperature, the assembly of bi-metallic strips 28 is operable to hold the thermal contact plug 14 out of engagement with the thermal contact plug 13, such that substantially the only heat coupling between plate 17 and the dissipating plate 12 is due to radiation and gaseous conduction and thus of relatively low order. For temperatures at plate 17 equal to or greater than the predetermined temperature, the bi-metallic strip assembly operates to move the contact plug 14 into engagement with the contact plug 13 to thereby establish a high conductivity thermal conduction path from the plate 17 to the plate 12, such path extension through the mounting ring 22, assembly of foil strips 33, and thermal contact plugs 13, 14, to the plate 12 wherefrom the excess heat is effectively dissipated by conduction, radiation, or both. Some degree of adjustment in the predetermined closure temperature may be facilitated, if desired, by providing for the selective longitudinal positioning of plug 13 relative to plug 14. More particularly, as the relative longitudinal spacing between the plugs is increased, so is the temperature at which switch closure is effected. Accordingly, the plate 12 may, for example, be sealably secured to the case 18 at varied longitudinal positions relative to the end of the case to, in turn, provide varied relative spacings between the plugs and correspondingly varied closure temperatures. Annular sealing elements (not shown) of graded thickness may, for example, be interposed between the plate 12 and case 18 to vary the longitudinal position of the plate relative to the end of the case. A similar variation in closure temperature may, of course, be alternatively effected through the employment of annular sealing elements of graded thickness between the ring 22 and end of the case. In addition, various bellows mounting arrangements may be employed in the securance of the case to either the plate 12 or the ring 22 to facilitate continuous variation in the relative longitudinal positions of the plugs 13, 14 and correspondingly, in switch closure temperature.

In order that the switch controlled heat transfer between the plates 17 and 12 provide the desired heat conservation and dissipating action at the plate 17 in an extremely effective manner, it will be appreciated that heat coupling between the plates 12 and 17, in addition to being made as high as possible by the establishment of a high conductivity conduction path through the contact plugs when they are engaged, should be made as low as possible when the contact plugs are disengaged. Accordingly, it is desirable that radiation coupling and gaseous conductance within the case 18 should be minimized to the maximum extent possible. In accordance with the present invention, decreased radiation coupling is advantageously facilitated by the provision of low emittance surfaces within the case. More particularly, the interior surface of the case, and interiorly facing surfaces of the plate 12, bi-metallic strips 28, foil strip groups 32, etc., are preferably of low emittance. With regard to minimized gaseous conductance within the case 18, the interior volume thereof is preferably maintained at a low pressure. Where the switch is employed in connection with space missions, it will be appreciated that in the rarified atmosphere of outer space, the gaseous conductance is of low order at the relatively low environmental pressures involved. For such applications, the enclosed volume of the case 18 is accordingly advantageously vented to atmosphere, as by means of vent holes 36 provided through the plate 12 at positions of communication with the case interior, to equalize the pressure of the case interior with that of the low pressure outer space environment. Aside from the low gaseous conductance thus afforded interiorly of the case, it will be appreciated that overstressing of the switch elements in vacuum operations is also prevented.

Where the case interior is vented to atmosphere and the switch is employed in a vacuum environment as just described, certain disadvantages may occur which would tend to offset the advantages effected. More particularly, where the interior of the case is maintained at vacuum pressures, there is substantial possibility of surface seizure or cold welding of the contacts 13, 14 when they are engaged, due to the loss of surface films and absorbed gases under vacuum conditions. To eliminate this problem, a solid film lubrication, such as a flash coating of light Teflon film, may be provided on the contact faces of the plugs 13, 14 without the introduction of serious increases in thermal resistance thereat. More preferably, however, the seizure problem is obviated in accordance with the present invention by the selective production of a surface contaminating gaseous environment within the case at the predetermined switch closures temperatures. More particularly, a gaseous environment is only provided under closed switch conditions (viz., at the predetermined closure temperatures) the gaseous environment being non-existent under open switch conditions such that the desired minimized gaseous conductance within the case is preserved. To the foregoing ends, certain low vapor pressure greases or subliming plastics having melting points of the order of the predetermined switch closure temperature may be disposed within the case to provide the desired gaseous environment for preventing surface seizure when the contact plugs are in engagement. For example, certain aromatic hydrocarbons, such as anthracene or phenanthrene posses vapor pressure and melting point characteristics which are particularly suited to various outer space applications of the switch of the present invention. Anthracene has a melting point of 421° F. and a vapor pressure of $2 \times 10^{-6}$ millimeters of mercury at 68° F., while the corresponding values for phenanthrene are 213° F. and $6 \times 10^{-5}$ millimeters of mercury at 68° F. Moreover, these compounds may be mixed to obtain a continuous variation in the melting point of the mixture between the two temperature limits specificed above to correspond to a range of typical upper operating temperature limits of various design applications in which the thermal switch may be employed. It is of particular importance to note that these compounds, or mixtures thereof, contribute required vapor pressure to the case interior below a particular melting point temperature selected to correspond to an operating temperature limit at which switch closure is effected. When the operating temperature limit is reached, or exceeded, and closure of the switch is effected, the additive material within the case sublimes and produces a gaseous contaminating atmosphere therein which is effective in preventing surface seizure of the switch contacts. It will be thus appreciated that the provision of an additive of the foregoing type within the case 18 insures reliable operation of the switch under vacuum conditions such as exist in outer space.

While the invention has been described hereinbefore with respect to a preferred embodiment, it will be appreciated that various modifications and changes may be made therein within the spirit and scope of the invention, and thus it is not desired to limit the invention except by the terms of the following claims.

What is claimed is:

1. A thermal switch comprising a plate of thermally conducting material having an integral thermal contact projecting therefrom, a ring of thermally conducting material parallel to and spaced from said plate, said ring secured to a thermally conducting surface and in heat exchange relation thereto, a tubular housing of thermally insulating material connecting said plate and ring, said housing in coaxial outwardly radially spaced relation to said contact, a second thermal contact disposed within said housing in coaxial alignment with said first contact, a first heat conducting means securing said second contact to said ring, said first heat conducting means consisting of a bi-metallic member operable to move said second contact into heat conductive engagement with said first contact in response to temperatures equal to and in excess of a predetermined temperature below which said bi-metallic member holds said second contact in spaced relation to said first contact, a second heat conducting means consisting of a flexible thermal conductor connecting said second contact and said ring to establish a higher conductivity heat transfer path therebetween compared to the path provided by said bi-metallic member, whereby said contacts are engaged when the ring temperature is equal to or greater than said predetermined temperature to thereby effect substantial heat transfer between said ring and plate, and said contacts are disengaged when the ring temperature is less than said predetermined temperature to thereby minimize heat transfer between said ring and plate.

2. A thermal switch according to claim 1 further defined by said bi-metallic member being defined by a plurality of bi-metallic strips radially secured to said ring and second contact.

3. A thermal switch according to claim 1, further defined by said flexible thermal conductor comprising a plurality of groups of superposed metallic foil strips radially secured to said second contact and said ring.

4. A thermal switch comprising a thermally conductive plate, a cylindrical thermally conductive contact plug integrally projecting from said plate, a thermally conductive ring adapted for attachment to a thermally conducting surface, said ring parallel to and spaced from said first plate in coaxial relation to said plug, a cylindrical tubular case of thermally insulating material connecting said plate and said ring, a second cylindrical thermally conductive contact plug disposed within said case in coaxial alignment with said first plug, a plurality of bi-metallic strips defining a cruciform radially securing said second plug to said ring and providing a low heat transfer path therebetween, said bi-metallic strips operable to move said second plug into and out of heat conductive engagement with said first plug in response to temperature variations respectively above and below a predetermined closure temperature, and a plurality of high thermal conductance flexible strips defining a cruciform radially connecting said ring and second plug and angularly displaced 45° relative to said bi-metallic strips and providing a high heat transfer path therebetween.

5. A thermal switch according to claim 4, further defined by the interior surfaces of said plate and said case and the inwardly facing surfaces of said bi-metallic strips and said high thermal conductance strips being of low emittance, and by the outwardly facing surfaces of said bi-metallic strips being of high emittance to minimize radiation coupling interiorly of said case while providing maximized radiation coupling interiorly of said case while providing maximized radiation coupling between sad bi-metallic strips and said thermally conducting surface to which said ring is secured.

6. A thermal switch according to claim 4, further defined by means within said case for maintaining a surface film between said plugs under conditions of low pressure and temperatures equal to or greater than said closure temperature to thereby prevent seizure of said plugs.

7. A thermal switch according to claim 6, further defined by said means for maintaining a surface film between said plugs comprising a low vapor pressure material disposed within said case and having a sublimation temperature of the order of said closure temperature.

8. A thermal switch comprising a cylindrical tubular case of low thermal conductivity material having a low emittance interior surface, a thermally conducting plate secured to one end of said case in closing relation thereto and having a cylindrical thermal contact plug projecting therefrom coaxially into said case, the interior surfaces of said plate having a low emittance, a thermally conducting ring having an outwardly flared flange at one end and an inwardly flared flange at the other end, said inwardly flared flange coaxially secured to the second end of said case, said inwardly flared flange having grooves in its proximal surface relative said case extending radially from the inner periphery of the inwardly flared flange at points of 90° circumferential displacement, a thermally conductive wall surface secured to said outwardly flared flange of said ring in closing relation thereto and thereby defining an enclosed volume with said case and plate, means for venting said enclosed volume to atmosphere, a second cylindrical thermal contact plug coaxially disposed within said case, a plurality of bi-metallic strips inwardly secured to said second plug and defining a cruciform, said strips respectively outwardly disposed within said grooves and providing a low heat transfer path between said second plug and ring, said strips operative to position said second plug out of engagement with said first plug at temperatures below a predetermined temperature and to position said second plug in engagement with said first plug at temperatures equal to and above said predetermined temperature, said strips having low emittance proximal surfaces and high emittance distal surfaces relative said case, and a plurality of flexible thermally conductive strips inwardly secured to said second plug and a defining a cruciform displaced 45° from that defined by said bi-metallic strips, said conductive strips outwardly secured to the distal face of said inwardly flared flange relative said case and providing a high heat transfer path between said second plug and said ring, said conductive strips having low emittance proximal surfaces relative said case.

9. A thermal switch according to claim 8, further defined by said bi-metallic strips being freely disposed within said grooves to facilitate flat uniform contact between said plugs.

10. A thermal switch according to claim 8, further defined by means for selectively varying the relative longitudinal positions of said plugs to vary said predetermined temperature at which contact of said plugs occurs.

11. A thermal switch according to claim 8, further defined by a low vapor pressure material disposed within said enclosed volume having a sublimation temperature of the order of said predetermined temperature.

References Cited by the Examiner

UNITED STATES PATENTS

| | | | |
|---|---|---|---|
| 1,703,803 | 2/29 | Widstrom | 236—1 |
| 2,363,375 | 11/44 | Wild | 165—96 |
| 2,451,903 | 10/48 | Bauman | 165—96 |

CHARLES SUKALO, *Primary Examiner.*